United States Patent [19]

Tozzi et al.

[11] 4,097,454

[45] Jun. 27, 1978

[54] BENZOPHENONE BASE STABILIZING AGENT FOR POLYMERS AND POLYMERS STABILIZED THEREBY

[75] Inventors: Antonio Tozzi, Sasso Marconi; Paolo Cassandrini, Bologna, both of Italy

[73] Assignee: Chimosa Chimica Organica S.p.A., Bologna, Italy

[21] Appl. No.: 694,591

[22] Filed: Jun. 10, 1976

Related U.S. Application Data

[63] Continuation of Ser. No. 476,340, Jun. 4, 1974, abandoned.

[30] Foreign Application Priority Data

Jun. 8, 1973    Italy ......................................... 50569

[51] Int. Cl.² ............................................... C08K 5/13

[52] U.S. Cl. ............................... 260/45.75 N; 252/404
[58] Field of Search ............... 260/45.75 R, 45.95 F, 260/5; 252/404

[56] References Cited

U.S. PATENT DOCUMENTS

| | | | |
|---|---|---|---|
| 3,284,403 | 11/1966 | Murdock | 260/45.85 S |
| 3,296,191 | 1/1967 | Smallwood et al. | 260/45.75 N |
| 3,448,133 | 6/1969 | Strobel et al. | 260/45.75 N |

*Primary Examiner*—V.P. Hoke

[57] ABSTRACT

A composition is described for stabilizing polypropylene homopolymers against the deteriorating effects of light, particularly ultraviolet light, comprising a mixture of (I) benzophenones with (II) metal complexes of related compounds.

8 Claims, No Drawings

BENZOPHENONE BASE STABILIZING AGENT FOR POLYMERS AND POLYMERS STABILIZED THEREBY

This is a continuation, of application Ser. No. 476,340, filed June 4, 1974 now abandoned.

The present invention refers to a stabilizer against the action of light rays for plastic materials obtained from polymers, particularly from polypropylene.

The stabilizer according to the invention consists of a synergically acting composition between benzophenones and a complex of a metal with benzophenones.

For the stabilization of polymers against ultraviolet light, for the production of plastic materials, the use of benzophenones of the formula

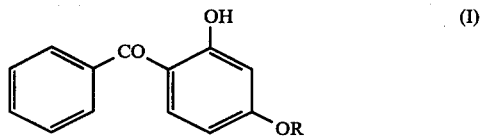

wherein R is an alkyl with 1 to 18 carbon atoms, is well known.

It is known that the presence of these compounds prevents or retards the formation of carbonyl groups in the molecule of the polymer, which formation is generally induced by radiations having a wave length ranging between 280 and 380 m $\mu$.

In the stabilization of polypropylene in particular, it has been found that nickel or cobalt base organometallic complexes give better results than those yielded by benzophenones used alone. Among these chelates the following

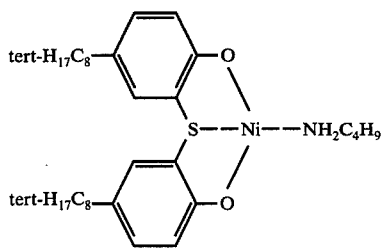

used in mixture with 2-hydroxy-4-alkoxy-benzophenones (with an alkyl chain from 6 to 18 carbon atoms) gives results by far superior to those obtained with the use of benzophenones alone. However, the compound of this formula has a bluish-green hue and causes therefore some difficulties in its use for yellow and red polymer fibers and furthermore it tends to decompose at the temperatures at which polymers are worked, causing undesirable colorations.

There are also known compounds of the formula

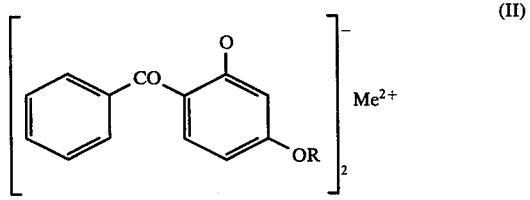

wherein Me is a metal, particularly Ni, Co, Zn, capable of forming complexes with the benzophenones.

These compounds, although already known in the literature, have so far never been used as stabilizers, since these products do not have actual advantages. also because they impart a marked yellow hue to the polymer.

The present invention supplies a stabilizer consisting of a mixture of compounds of the formula (I) with compounds of the formula (II), by means of which a much more efficient stabilization of the polymers, particularly of polypropylene is obtained. This stabilization is at least two times greater than that obtained using the same compounds (I) and (II) individually. This synergic effect of the mixture could not be expected a priori. Furthermore the mixtures of these two stabilizers give tones of yellow which are paler and therefore they may be utilized also on yellow and red hues.

Tests were carried out, using polypropylene having a melting flow index (M.F.I.) of approximately 6, charged, in addition to these ultraviolet light absorbing stabilizing agents, with an antioxidant system consisting of 0.5 weight % dilauryl-thiodipropionate, 0.25 weight % of a phenolic antioxidant and 0.4 weight % of calcium stearate.

From the so charged polymer a granulate was prepared and from this granulate disks of approximately 0.5 mm thickness were obtained from which test pieces of 50 mm length were produced, which were subjected to tensile tests, at intervals of 300 hours of exposure to Xenotest 150 ® (apparatus for the exposure of the specimens to a xenon lamp) up to the embrittlement point.

The results are indicated in the following table.

| test piece | embrittlement interval (hours) |
|---|---|
| A | 600–900 |
| B | 1200–1500 |
| C | 900–1200 |
| D | 1500–1800 |
| E | 900–1200 |
| F | 900–1200 |
| G | 1200–1500 |
| H | 2100–2400 |
| J | 2700–3000 |
| L | 1500–1900 |
| M | 2100–2403 |
| N | 2100–2400 |
| O | 900–1200 |

The test pieces used were the following:
A: standard polypropylene;
B: polypropylene with 0.3 weight % of butylamine-nickel chelate of 2,2'-thiobis-(4-ditert.octylphenol);
C: polypropylene with 0.3 weight % of nickel chelate of 2-hydroxy-4-methoxy-benzophenone;
D: polypropylene with 0.3 weight % of nickel chelate of 2-hydroxy-4-n-octoxybenzophenone;
E: polypropylene with 0.3 weight % of 2-hydroxy-4-n-octoxybenzophenone;
F: polypropylene with 0.5 weight % of 2-hydroxy-4-n-octoxybenzophenone;
G: polypropylene with 0.3 weight % of butylamine-nickel chelate of 2,2'-thiobis-(4-ditert.octylphenol) plus 0.3 weight % of 2-hydroxy-4-n-octoxybenzophenone;
H: polypropylene with 0.3 weight % of the nickel chelate of 2-hydroxy-4-methoxybenzophenone plus 0.3 weight % of of 2-hydroxy-4-n-octoxybenzophenone;
I: polypropylene with 0.3 weight % of nickel chelate of 2-hydroxy-4-n-octoxybenzophenone plus 0.3 weight % of 2-hydroxy-4-n-octoxybenzophenone;

L: polypropylene with 0.5 weight % of cobalt chelate of 2-hydroxy-4-n-octoxybenzophenone;
M: polypropylene with 0.5 weight % of nickel chelate of 2-hydroxy-4-n-octoxybenzophenone;
N: polypropylene with 0.3 weight % of cobalt chelate of 2-hydroxy-4-n-octoxybenzophenone plus 0.3 weight % of 2-hydroxy-4-n-octoxybenzophenone;
O: polypropylene with 0.5 weight % of nickel chelate of 2-hydroxy-4-methoxybenzophenone.

The table shows that the test pieces H, I and N yield an appreciable lengthening of the life of the polymer treated with the stabilizing mixture as compared with the same polymers used with merely a single component of the mixture.

These results yield a considerable economical advantage, as they permit the use of derivatives of the 2-hydroxy-alcoxybenzophenone, which are relatively less complex than the types existing on the market and are more easily available.

What is claimed is:

1. A stabilizer for polypropylene against the action of light, comprising a mixture containing substantially equal proportions of compounds of the formula

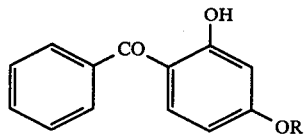

wherein R is a linear alkyl chain from 1 to 18 carbon atoms, with compounds of the formula

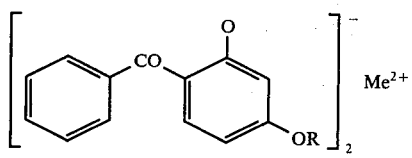

wherein Me is Ni or Co, and R is a linear alkyl chain from 1 to 18 carbon atoms.

2. A stabilizer according to claim 1, wherein R is a methyl group.

3. A stabilizer according to claim 1, wherein R is an octyl group.

4. A stabilizer according to claim 1, wherein Me is a nickel atom.

5. A stabilizer according to claim 1, wherein Me is a cobalt atom.

6. A polypropylene stabilized with the stabilizer according to claim 1 by adding to it said stabilizer to the proportion of 0.05 to 1.5 weight % of said polymer.

7. A polypropylene stabilized according to claim 6, wherein said stabilizer is a mixture of 2-hydroxy-4-alkoxybenzophenones and nickel chelates of 2-hydroxy-4-alkoxybenzophenones, and further incorporating an antioxidant system consisting of 0.5 weight % dilaurylthiodipropionate and 0.25 weight % of a phenolic antioxidant.

8. A polypropylene according to claim 6, wherein said stabilizer is a mixture of 2-hydroxy-4-alkoxy-benzophenones and cobalt chelates of 2-hydroxy-4-alkoxybenzophenones, and further incorporating an antioxidant system consisting of 0.5 weight % of dilaurylthiopropionate and 0.25 weight % of a phenolic antioxidant.

* * * * *